US012546216B2

(12) United States Patent
Ayadiuno et al.

(10) Patent No.: US 12,546,216 B2
(45) Date of Patent: Feb. 10, 2026

(54) METHODS AND SYSTEMS FOR PREDICTING LITHOLOGY AND FORMATION BOUNDARY AHEAD OF THE BIT

(71) Applicant: SAUDI ARABIAN OIL COMPANY, Dhahran (SA)

(72) Inventors: Christopher Ayadiuno, Dhahran (SA); Yupeng Li, Beijing (CN); Saeed Shahrani, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 131 days.

(21) Appl. No.: 18/247,611

(22) PCT Filed: Oct. 13, 2022

(86) PCT No.: PCT/CN2022/125024
§ 371 (c)(1),
(2) Date: Mar. 31, 2023

(87) PCT Pub. No.: WO2024/077538
PCT Pub. Date: Apr. 18, 2024

(65) Prior Publication Data

US 2024/0368983 A1 Nov. 7, 2024

(51) Int. Cl.
*E21B 49/00* (2006.01)
*G01V 20/00* (2024.01)

(52) U.S. Cl.
CPC ........ *E21B 49/003* (2013.01); *E21B 2200/20* (2020.05); *E21B 2200/22* (2020.05); *G01V 20/00* (2024.01)

(58) Field of Classification Search
CPC .... E21B 49/00; E21B 49/003; E21B 2200/22; G01V 20/00
See application file for complete search history.

(56) References Cited

U.S. PATENT DOCUMENTS 7,359,845 B2 4/2008 Kelfoun
2015/0106015 A1 4/2015 Dashevskiy et al.
(Continued)

FOREIGN PATENT DOCUMENTS

CN 1341803 A 3/2002
CN 105488248 A 4/2016
(Continued)

OTHER PUBLICATIONS

Provost, C. E., "A Real-Time Normalized Rate of Penetration Aids in Lithology and Pore Pressure Prediction", SPE-16165, SPE/IADC Drilling Conference, New Orleans, 1987 (7 pages).
(Continued)

*Primary Examiner* — Kristyn A Hall
(74) *Attorney, Agent, or Firm* — Osha Bergman Watanabe & Burton LLP

(57) ABSTRACT

A method includes drilling a wellbore in a current well. An interval of the wellbore comprises a first portion of the wellbore and a second portion of the wellbore. The method also includes obtaining an offset drilling log and an offset lithology log for a geologically similar interval in an offset well and training a first machine learning model, using the offset drilling log, to produce a first trained machine learning model. The method further includes producing, using the first trained machine learning model, a forecasted drilling log for the second portion of the wellbore in the current well, training a second machine learning model, using a gradient boosting machine learning technique, the forecasted drilling log, and the offset lithology log, to produce a second trained machine learning model, and producing, using the second trained machine learning model, a forecasted lithology log for the second portion of the current well.

16 Claims, 8 Drawing Sheets

(56) References Cited

U.S. PATENT DOCUMENTS

| | | | | |
|---|---|---|---|---|
| 2015/0356403 | A1 | 12/2015 | Storm, Jr. | |
| 2018/0238148 | A1 | 8/2018 | Canady et al. | |
| 2019/0249498 | A1 * | 8/2019 | Hinz | E21B 10/633 |
| 2019/0368348 | A1 * | 12/2019 | Tiwari | G01V 1/50 |
| 2020/0012718 | A1 * | 1/2020 | Kung | G06N 20/00 |
| 2021/0148213 | A1 * | 5/2021 | Madasu | E21B 49/003 |
| 2022/0090481 | A1 * | 3/2022 | Aljedaani | G06N 3/006 |
| 2024/0202407 | A1 * | 6/2024 | Boualleg | G06F 30/27 |
| 2024/0254874 | A1 * | 8/2024 | Katterbauer | E21B 47/02 |

FOREIGN PATENT DOCUMENTS

| | | | |
|---|---|---|---|
| CN | 105549114 | A | 5/2016 |
| CN | 109919184 | A | 6/2019 |
| CN | 110852018 | A | 2/2020 |
| CN | 111598444 | A | 8/2020 |
| CN | 111914478 | A | 11/2020 |
| CN | 111984928 | A | 11/2020 |
| CN | 112989708 | A | 6/2021 |
| WO | 2006/053294 | A1 | 5/2006 |

OTHER PUBLICATIONS

Ablard, P. et al., "The Expanding Role of Mud Logging", Oilfield Review, vol. 24, No. 1, pp. 24-41, 2012 (18 pages).

Ortega, C., "A Complete Petrophysical Evaluation Method for Tight Formations From Drill Cuttings Only in the Absence of Well Logs", SPE-16875, SPE Journal, pp. 1-12, 2013 (12 pages).

Moazzeni, A. et al., "Artificial Intelligence for Lithology Identification Through Real-time Drilling Data", Journal of Earth Science and Climatic Change. vol. 6, No. 3, pp. 1-4, 2014 (4 pages).

Hurst, Andrew et al., "Predicting Reservoir Characteristics From Drilling and Hydrocarbon-Gas Data Using Advanced Computational Mathematics", Paper No. SPE-123785, presented at the SPE Offshore Europe Oil and Gas Conference and Exhibition, Aberdeen, UK, 2009 (10 pages).

Onyia , E. C., "Relationships Between Formation Strength, Drilling Strength, and Electric Log Properties", Paper No. SPE-18166-MS, presented at the SPE Annual Technical Conference and Exhibition, Houston, Texas, 1988 (14 pages).

Gupta, Ishank et al., "Looking Ahead of the Bit Using Surface Drilling and Petrophysical Data: Machine-Learning-Based Real-Time Geosteering in Volve Field", SPE-199882, SPE Journal, pp. 990-1006, 2020 (17 pages).

Li, H. et al., "Applications of Artificial Intelligence in Oil and Gas Development", Archives of Computational Methods in Engineering, pp. 937-949, 2021 (13 pages).

Chen, Gang et al., "A New Method of Lithology Classification Based on Convolutional Neural Network Algorithm by Utilizing Drilling String Vibration Data", Energies, vol. 13, No. 888, 2020 (24 pages).

Li, Yuanjun et al., "Prediction of Penetration Rate Ahead of the Bit through Real-Time Updated Machine Learning Models" Paper No. SPE/IADC-194105-MS, presented at the SPE/IADC International Drilling Conference and Exhibition, The Hague, The Netherlands, 2019 (8 pages).

Perez-Tellez, Carlos et al., "Applying a Real-Time Engineering Methodology To Drill Ahead of Potential Undesirable Events", Paper No. OTC-23180-MS, presented at the Offshore Technology Conference, Houston, Texas, USA, 2012 (8 pages).

Yin, Qishuai et al., "Machine Learning for Deepwater Drilling: Gas-Kick-Alarm Classification Using Pilot-Scale Rig Data with Combined Surface-Riser-Downhole Monitoring" SPE-205365, SPE Journal, 2021 (28 pages).

Kuang, Lichun et al., "Application and development trend of artificial intelligence in petroleum exploration and development", Petroleum Exploration and Development, vol. 48, Issue 1, pp. 1-14, 2021 (14 pages).

International Search Report and Written Opinion of the International Searching Authority issued in corresponding International Application No. PCT/CN2022/125024, mailed May 17, 2023 (9 pages).

* cited by examiner

500

| WELL | DEPTH | FLWPMPS | BS | RPM | WOB | ROP | TORQ | Lithology |
|---|---|---|---|---|---|---|---|---|
| 822-3 | 10140 | 682.30 | 12.00 | 54.78 | 45.92 | 5.52 | 2.50 | Dolomite |
| 822-3 | 10141 | 694.35 | 12.00 | 52.07 | 47.79 | 9.28 | 2.40 | Dolomite |
| 822-3 | 10142 | 693.94 | 12.00 | 77.50 | 47.63 | 4.46 | 2.40 | Dolomite |
| 822-3 | 10143 | 696.57 | 12.00 | 51.22 | 49.30 | 3.47 | 2.40 | Dolomite |
| 822-3 | 10144 | 694.60 | 12.00 | 54.84 | 48.16 | 7.94 | 2.20 | Dolomite |
| 822-3 | 10145 | 663.17 | 12.00 | 60.13 | 47.45 | 7.35 | 2.20 | Dolomite |
| 822-3 | 10146 | 691.31 | 12.00 | 55.92 | 49.54 | 5.83 | 2.60 | Dolomite |
| 822-3 | 10147 | 666.41 | 12.00 | 114.98 | 46.37 | 9.48 | 2.40 | Dolomite |
| 822-3 | 10148 | 670.39 | 12.00 | 114.17 | 44.92 | 8.23 | 2.60 | Dolomite |
| 822-3 | 10149 | 693.00 | 12.00 | 111.87 | 45.88 | 11.75 | 2.50 | Dolomite |
| 822-3 | 10150 | 681.58 | 12.00 | 111.33 | 47.90 | 8.19 | 2.50 | Dolomite |
| 822-3 | 10151 | 682.89 | 12.00 | 114.46 | 49.41 | 15.72 | 2.80 | Dolomite |
| 822-3 | 10152 | 682.16 | 12.00 | 111.42 | 46.37 | 8.60 | 2.40 | Dolomite |
| 822-3 | 10153 | 682.36 | 12.00 | 106.64 | 45.08 | 11.17 | 2.50 | Dolomite |
| 822-3 | 10154 | 693.47 | 12.00 | 114.35 | 49.47 | 9.30 | 2.10 | Dolomite |
| 822-3 | 10155 | 693.83 | 12.00 | 112.21 | 46.37 | 9.92 | 2.40 | Dolomite |
| 822-3 | 10156 | 691.61 | 12.00 | 114.12 | 44.97 | 9.11 | 2.80 | Dolomite |

| | | | | | | | | |
|---|---|---|---|---|---|---|---|---|
| 18-5 | 10544 | 161.00 | 5.88 | 50.00 | 7.00 | 13.12 | 1.80 | shale |
| 18-5 | 10545 | 161.00 | 5.88 | 50.00 | 7.90 | 13.65 | 1.80 | shale |
| 18-5 | 10546 | 161.00 | 5.88 | 50.00 | 8.10 | 15.40 | 1.90 | shale |
| 18-5 | 10547 | 161.00 | 5.88 | 50.00 | 7.30 | 15.77 | 1.90 | shale |
| 18-5 | 10548 | 161.00 | 5.88 | 50.00 | 8.10 | 16.80 | 1.90 | shale |
| 18-5 | 10549 | 161.00 | 5.88 | 50.00 | 7.50 | 14.00 | 1.80 | shale |
| 18-5 | 10550 | 161.00 | 5.88 | 50.00 | 6.90 | 16.69 | 1.90 | shale |
| 18-5 | 10551 | 161.00 | 5.88 | 50.00 | 6.90 | 12.91 | 1.80 | shale |
| 18-5 | 10552 | 161.00 | 5.88 | 50.00 | 8.60 | 15.10 | 1.80 | shale |
| 18-5 | 10553 | 161.00 | 5.88 | 50.00 | 8.40 | 12.57 | 1.80 | shale |
| 18-5 | 10554 | 161.00 | 5.88 | 50.00 | 8.90 | 15.85 | 1.90 | shale |
| 18-5 | 10555 | 161.00 | 5.88 | 50.00 | 7.20 | 11.91 | 1.90 | shale |
| 18-5 | 10556 | 161.00 | 5.88 | 50.00 | 6.20 | 11.51 | 1.80 | shale |
| 18-5 | 10557 | 161.00 | 5.88 | 50.00 | 7.30 | 9.56 | 1.80 | shale |
| 18-5 | 10558 | 161.00 | 5.88 | 50.00 | 8.20 | 13.63 | 1.90 | shale |
| 18-5 | 10559 | 151.00 | 5.88 | 50.00 | 9.70 | 9.17 | 1.90 | shale |
| 18-5 | 10560 | 133.00 | 5.88 | 48.00 | 9.60 | 17.18 | 2.20 | shale |

| ⊿ | A | B | C | D | E | F | G | H | I | J | K |
|---|---|---|---|---|---|---|---|---|---|---|---|
| 1 | WELL | DEPTH | FLWPMPS | BS | RPM | WOB | ROP | TORQ | MSE | Bit Area | VOL_ANTHY_1 |
| 2 | 822-3 | 10140.00 | 682.30 | 12.00 | 54.78 | 45.92 | 5.52 | 2.50 | 0.29 | 113.11 | 0 |
| 3 | 822-3 | 10141.00 | 694.35 | 12.00 | 52.07 | 47.79 | 9.28 | 2.40 | 0.16 | 113.11 | 0 |
| 4 | 822-3 | 10142.00 | 693.94 | 12.00 | 77.50 | 47.63 | 4.46 | 2.40 | 0.49 | 113.11 | 0 |
| 5 | 822-3 | 10143.00 | 696.57 | 12.00 | 51.22 | 49.30 | 3.47 | 2.40 | 0.41 | 113.11 | 0 |
| 6 | 822-3 | 10144.00 | 694.60 | 12.00 | 54.84 | 48.16 | 7.94 | 2.20 | 0.18 | 113.11 | 0 |
| 7 | 822-3 | 10145.00 | 663.17 | 12.00 | 60.13 | 47.45 | 7.35 | 2.0 | 0.21 | 113.11 | 0 |
| 8 | 822-3 | 10146.00 | 691.31 | 12.00 | 55.92 | 49.54 | 5.83 | 2.60 | 0.29 | 113.11 | 0 |
| 9 | 822-3 | 10147.00 | 666.41 | 12.00 | 114.98 | 46.37 | 9.48 | 2.40 | 0.34 | 113.11 | 0 |
| 10 | 822-3 | 10148.00 | 670.39 | 12.00 | 114.17 | 44.92 | 8.23 | 2.60 | 0.42 | 113.11 | 0 |
| 11 | 822-3 | 10149.00 | 693.00 | 12.00 | 111.87 | 45.88 | 11.75 | 2.50 | 0.28 | 113.11 | 0 |
| 12 | 822-3 | 10150.00 | 681.58 | 12.00 | 111.33 | 47.90 | 8.19 | 2.50 | 0.40 | 113.11 | 0 |
| 13 | 822-3 | 10151.00 | 682.89 | 12.00 | 114.46 | 49.41 | 15.72 | 2.80 | 0.24 | 113.11 | 0 |
| 14 | 822-3 | 10152.00 | 682.16 | 12.00 | 111.42 | 46.37 | 8.60 | 2.40 | 0.36 | 113.11 | 0 |

| X | | | | | | Y |
|---|---|---|---|---|---|---|
| L | M | N | O | P | Q | R |
| VOL_DOL_1 | VOL_DOLLS_1 | VOL_LS_1 | VOL_SAND_1 | VOL_SH_1 | VOL_SILT | Lithology |
| 100 | 0 | 0 | 0 | 0 | 0 | Dolomite |
| 100 | 0 | 0 | 0 | 0 | 0 | Dolomite |
| 100 | 0 | 0 | 0 | 0 | 0 | Dolomite |
| 100 | 0 | 0 | 0 | 0 | 0 | Dolomite |
| 100 | 0 | 0 | 0 | 0 | 0 | Dolomite |
| 100 | 0 | 0 | 0 | 0 | 0 | Dolomite |
| 100 | 0 | 0 | 0 | 0 | 0 | Dolomite |
| 100 | 0 | 0 | 0 | 0 | 0 | Dolomite |
| 100 | 0 | 0 | 0 | 0 | 0 | Dolomite |
| 100 | 0 | 0 | 0 | 0 | 0 | Dolomite |
| 100 | 0 | 0 | 0 | 0 | 0 | Dolomite |
| 100 | 0 | 0 | 0 | 0 | 0 | Dolomite |
| 100 | 0 | 0 | 0 | 0 | 0 | Dolomite |

FIG. 6
(Continued)

METHODS AND SYSTEMS FOR PREDICTING LITHOLOGY AND FORMATION BOUNDARY AHEAD OF THE BIT

BACKGROUND

Hydrocarbons are found in porous rock formations located beneath the Earth's surface. Wells are drilled into these formations to access and produce the hydrocarbons. Wells have a wellbore, i.e., a hole drilled into the Earth's surface. As the wellbore is being drilled, drilling logs show various data points that correspond with the drilling operation. The drilling logs are monitored while drilling to show what is happening downhole and to ensure operating ranges are being followed. Drilling logs along with cuttings gathered from the wellbore may be analyzed to determine the lithology of the rock formation being drilled. Different lithologies effect the drilling parameters and encountering unexpected lithologies while drilling with inappropriate drilling parameters may cause a well control incident.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure presents, in accordance with one or more embodiments methods and systems for forecasting lithology logs and drilling logs for an interval of a wellbore. The method includes drilling a wellbore in a current well using a drill bit. An interval of the wellbore comprises a first portion of the wellbore located up hole from the drill bit and a second portion of the wellbore located downhole from the drill bit (i.e., "ahead" of the drill bit). The method also includes obtaining an offset drilling log and an offset lithology log for a geologically similar interval in an offset well and training a first machine learning model, using a computer processor and the offset drilling log, to produce a first trained machine learning model. The first machine learning model comprises a recurrent neural network. The method further includes producing, using the computer processor and the first trained machine learning model, a forecasted drilling log for the second portion of the wellbore in the current well, training a second machine learning model, using the computer processor, a gradient boosting machine learning technique, the forecasted drilling log, and the offset lithology log, to produce a second trained machine learning model, producing, using the computer processor and the second trained machine learning model, a forecasted lithology log for the second portion of the current well, and adjusting drilling parameters in response to the forecasted lithology log.

The system includes a current well and a non-transitory computer readable medium in electronic communication with the current well. The current well has a wellbore being drilled by a drill bit. An interval of the wellbore comprises a first portion of the wellbore located up hole from the drill bit and a second portion of the wellbore located downhole from the drill bit. The non-transitory computer readable medium stores a set of instructions, executable by a computer processor. The set of instructions comprise functionality for obtaining an offset drilling log and an offset lithology log for a geologically similar interval in an offset well and training a first machine learning model, using the offset drilling log, to produce a first trained machine learning model. The first machine learning model comprises a recurrent neural network. The set of instructions further comprise functionality for producing, using the first trained machine learning model, a forecasted drilling log for the second portion of the wellbore in the current well, training a second machine learning model, using a gradient boosting machine learning technique, the forecasted drilling log, and the offset lithology log, to produce a second trained machine learning model, producing, using the second trained machine learning model, a forecasted lithology log for the second portion of the current well, and adjusting drilling parameters in response to the forecasted lithology log.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

FIG. 5 shows an example of LSTM training data in accordance with one or more embodiments.

FIG. 6 shows an example of boosting training data in accordance with one or more embodiments.

DETAILED DESCRIPTION

Figure 1:
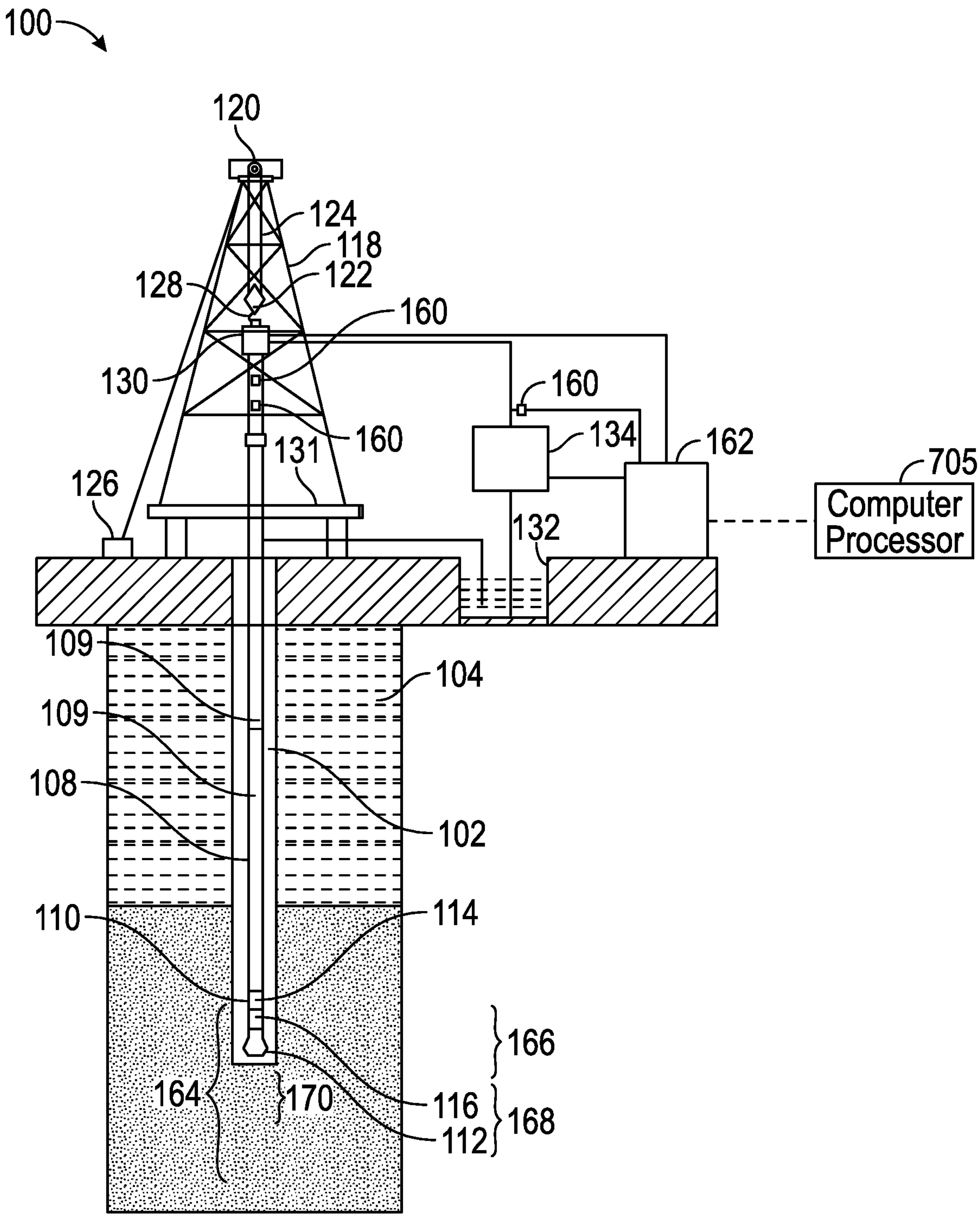
FIG. 1 shows an example well site in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-7, any component described regarding a figure, in various embodiments disclosed herein, may be equivalent to one or more like-named components described with regard to any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "an seismic signal" includes reference to one or more of such seismic signals.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Embodiments disclosed herein relate to a method and system for predicting lithology and formation boundary in a target wellbore ahead of the bit. The method is based on two machine learning models and uses mudlog and drilling data such as weight on bit (WOB), rotation per minute (RPM), bit size (BS), torque (TORQ), rate of penetration (ROP), flow pump (FPMP) rate, lithology and mechanical specific energy (MSE) from offset/reference wells as input to forecast lithology and formation boundary in a drilling wellbore ahead of the bit. Determination of formation lithology and formation boundary is a non-linear geological problem that may be resolved by machine learning methodologies. Machine learning and artificial intelligence are able to establish complicated non-linear relationships between input data and outcomes.

FIG. 1 shows an example well site (100) in accordance with one or more embodiments. In general, well sites may be configured in a myriad of ways. Therefore, well site (100) is not intended to be limiting with respect to the particular configuration of the drilling equipment. The well site (100) is depicted as being on land. In other examples, the well site (100) may be offshore, and drilling may be carried out with or without use of a marine riser. A drilling operation at well site (100) may include drilling a wellbore (102) into a subsurface including various formations (104). For the purpose of drilling a new section of wellbore (102), a drill string (108) is suspended within the wellbore (102).

The drill string (108) may include one or more drill pipes (109) connected to form conduit and a bottom hole assembly (BHA) (110) disposed at the distal end of the conduit. The BHA (110) may include a drill bit (112) to cut into the subsurface rock. The BHA (110) may include measurement tools, such as a measurement-while-drilling (MWD) tool (114) and logging-while-drilling (LWD) tool 116. Measurement tools (114, 116) may include sensors and hardware to measure downhole drilling parameters, and these measurements may be transmitted to the surface using any suitable telemetry system known in the art. The BHA (110) and the drill string (108) may include other drilling tools known in the art but not specifically shown.

The drill string (108) may be suspended in wellbore (102) by a derrick (118). A crown block (120) may be mounted at the top of the derrick (118), and a traveling block (122) may hang down from the crown block (120) by means of a cable or drilling line (124). One end of the cable (124) may be connected to a drawworks (126), which is a reeling device that may be used to adjust the length of the cable (124) so that the traveling block (122) may move up or down the derrick (118). The traveling block (122) may include a hook (128) on which a top drive (130) is supported.

The top drive (130) is coupled to the top of the drill string (108) and is operable to rotate the drill string (108). Alternatively, the drill string (108) may be rotated by means of a rotary table (not shown) on the drilling floor (131). Drilling fluid (commonly called mud) may be stored in a mud pit (132), and at least one pump (134) may pump the mud from the mud pit (132) into the drill string (108). The mud may flow into the drill string (108) through appropriate flow paths in the top drive (130) (or a rotary swivel if a rotary table is used instead of a top drive to rotate the drill string (108)).

In one implementation, a system (162) may be disposed at or communicate with the well site (100). System (162) may control at least a portion of a drilling operation at the well site (100) by providing controls to various components of the drilling operation. In one or more embodiments, system (162) may receive data from one or more sensors (160) arranged to measure controllable parameters of the drilling operation. As a non-limiting example, sensors (160) may be arranged to measure WOB (weight on bit), RPM (drill string rotational speed), GPM (flow rate of the mud pumps), and ROP (rate of penetration of the drilling operation).

In further embodiments, the system (162) is connected, wirelessly or wired, to a computer processor (705). The computer processor (705) may be part of a larger computer (702) system. In other embodiments, the system (162) is the computer (702) system, and the computer processor (705) is located in the system (162) without departing from the scope of the disclosure herein. The computer processor (705) and the computer (702) system are outlined in further detail in FIG. 7.

Sensors (160) may be positioned to measure parameter(s) related to the rotation of the drill string (108), parameter(s) related to travel of the traveling block (122), which may be used to determine ROP of the drilling operation, and parameter(s) related to flow rate of the pump (134). For illustration purposes, sensors (160) are shown on drill string (108) and proximate mud pump (134). The illustrated locations of sensors (160) are not intended to be limiting, and sensors (160) could be disposed wherever drilling parameters need to be measured. Moreover, there may be many more sensors (160) than shown in FIG. 1 to measure various other parameters of the drilling operation. Each sensor (160) may be configured to measure a desired physical stimulus.

During a drilling operation at the well site (100), the drill string (108) is rotated relative to the wellbore (102), and weight is applied to the drill bit (112) to enable the drill bit (112) to break rock as the drill string (108) is rotated. In some cases, the drill bit (112) may be rotated independently with a drilling motor. In further embodiments, the drill bit (112) may be rotated using a combination of the drilling motor and the top drive (130) (or a rotary swivel if a rotary table is used instead of a top drive to rotate the drill string (108)). While cutting rock with the drill bit (112), mud is pumped into the drill string (108).

The mud flows down the drill string (108) and exits into the bottom of the wellbore (102) through nozzles in the drill bit (112). The mud in the wellbore (102) then flows back up to the surface in an annular space between the drill string (108) and the wellbore (102) with entrained cuttings. The mud with the cuttings is returned to the pit (132) to be circulated back again into the drill string (108). Typically, the cuttings are removed from the mud, and the mud is reconditioned as necessary, before pumping the mud again into the drill string (108). In one or more embodiments, the drilling operation may be controlled by the system (162).

It is beneficial to know the lithology of the formation (104) that is being drilled or is about to be drilled. Accurate prediction of the formation (104) lithology is important because the drilling parameters are adjusted to drill the formation (104) efficiently and safely. Currently, upcoming formation (104) lithology and bed boundary identification are performed by a wellsite geologist analyzing real-time drilling logs and cuttings of the formation (104) as the wellbore (102) is being drilled.

Current practices are inefficient and lead to inaccurate predictions of upcoming lithologies due to the inherent inability of the wellsite geologist to manually integrate all relevant geological and drilling data. As such, systems and methods that can provide more accurate information about upcoming lithologies of the formation (104) is beneficial. Thus, methodologies presented herein enable accurate prediction of the lithology of an interval (164) of a wellbore (102) being drilled using real-time drilling logs, real-time lithology logs, and machine learning models trained with offset drilling logs and offset lithology logs from offset wells.

The interval (164) may be a length of the near wellbore (102) formation (104). The interval (164) may be located both up hole and down hole from a depth of the drill bit (112). In accordance with one or more embodiments, the interval (164) includes a first portion (166) of the wellbore (102) located up hole from the drill bit (112) and a second portion (168) of the wellbore (102) located downhole from the drill bit (112). As shown in FIG. 1, the interval (164) may include a length of the formation (104) that has already been drilled as well as a length of the formation (104) that is yet to be drilled or about to be drilled.

FIG. 1 also distinguishes a section (170) of the second portion (168). The section (170) represents the length of the second portion (168) that is first drilled by the drill bit (112) and the drilling logs and lithology logs obtained while drilling the section (170) may be used to update the machine learning models to create more accurate forecasted drilling logs and lithology logs of the second portion (168). Further, more than one intervals (164) of the wellbore (102) may exist, and the intervals (164) may overlap one another without departing from the scope of the disclosure herein.

Figure 2:
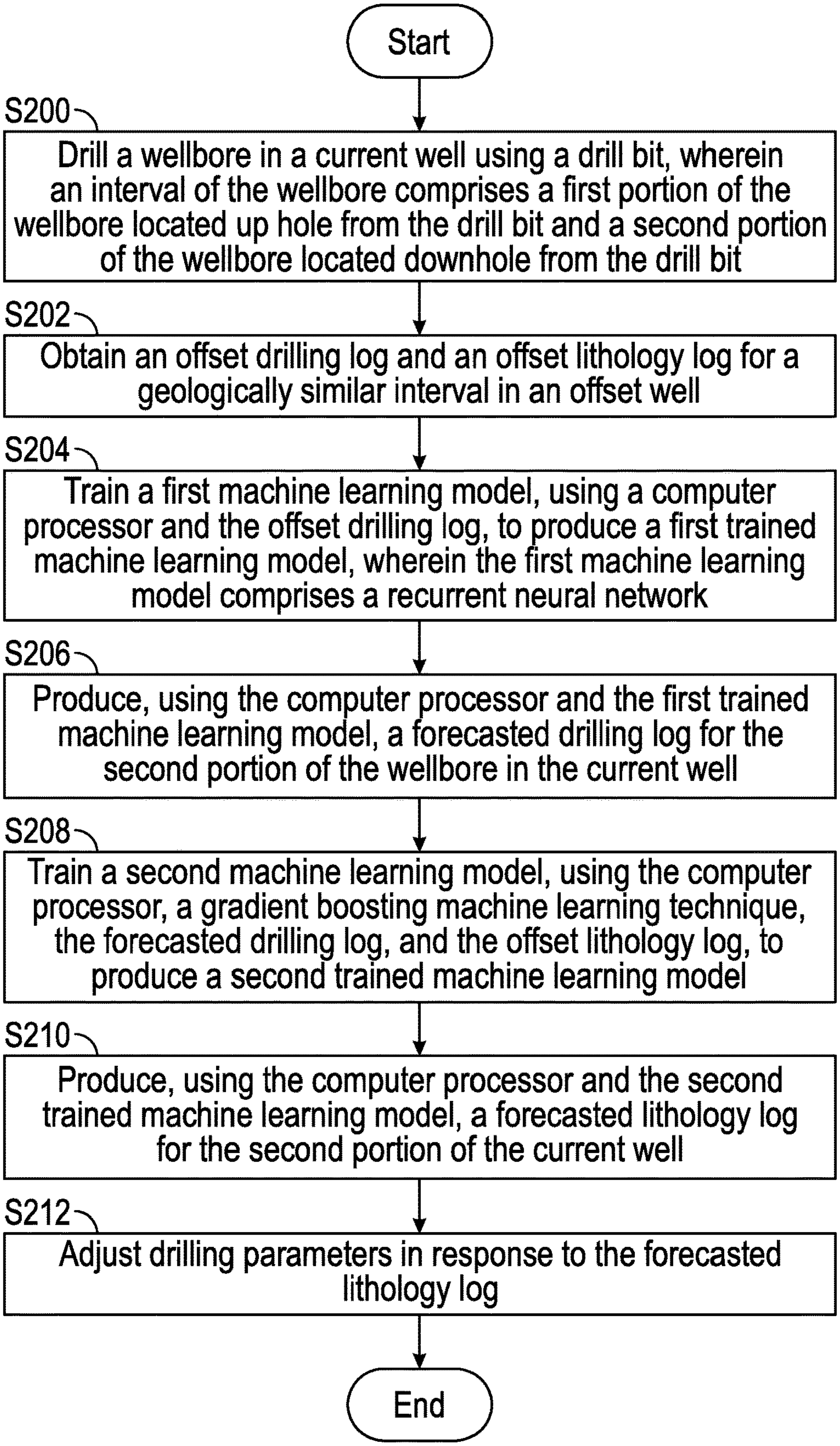
FIG. 2 shows a flowchart in accordance with one or more embodiments.

FIG. 2 shows a flowchart in accordance with one or more embodiments. The flowchart outlines a method for forecasting the lithology of an interval (164) and adjusting drilling parameters in response to the forecasted lithology. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In step 200, a wellbore (102) is drilled in a current well (300) using a drill bit (112). An interval (164) of the wellbore (102) may include a first portion (166) of the wellbore (102) located up hole (before) from the drill bit (112) and a second portion (168) of the wellbore (102) located downhole from the drill bit (112). The current well (300) describes the well that is in the process of being drilled. The term "current" is not meant to be limiting and is used to distinguish the well being drilled from nearby offset wells (304).

Figure 3:
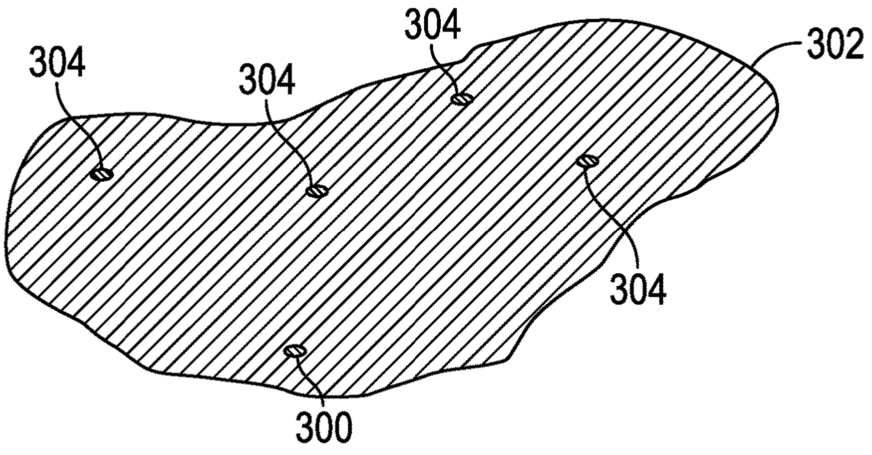
FIG. 3 shows a current well in a field in accordance with one or more embodiments.

FIG. 3 shows a current well (300) in a field (302) in accordance with one or more embodiments. A plurality of offset wells (304) are located in the same field (302). The field (302) is a geographical region that has similar subsurface formation (104) lithology. The current well (300) is the well that is undergoing a drilling operation and the offset wells (304) are wells that have already undergone at least one drilling operation.

In further embodiments, the current well (300) is the well site (100) outlined in FIG. 1, and the current well (300) and the offset wells (304) intersect similar formations (104). Further, the interval (164) in the current well (300) has a geologically similar interval located in the offset well (304). The interval (164) in the current well (300) and the geologically similar interval in the offset well (304) may not have the same numerical depth values due to changes in the topography of the field (302). However, the interval (164) and the geologically similar interval correspond to one another by the geometry and lithology of the subsurface.

Returning to FIG. 2, in step 202, an offset drilling log and an offset lithology log are obtained for the geologically similar interval in an offset well (304). Without departing from the scope of the disclosure herein, a plurality of offset drilling logs and a plurality of offset lithology logs from a plurality of offset wells (304) may be obtained. The offset drilling logs are one or more curves selected from a list consisting of: weight on bit (WOB), rotations per minute (RPM), bit size (BS), torque (TORQ), flow pump (FLPMP) rate, rate of penetration (ROP), mechanical specific energy (MSE), and mud-log lithology.

The offset lithology logs are logs that show the lithology of the formations (104) in the subsurface by depth. The offset lithology logs may be obtained manually by analyzing cuttings obtained during the drilling operation of the offset wells at various depths. The offset lithology logs may also be created, in part, using data obtained by various logging tools that have been run on the offset wells (304). The offset lithology log(s) and the offset drilling log(s) may be stored in a database operatively connected to the well site (100). The offset drilling log and the offset lithology logs may be optimized by removing outliers from the data sets.

In further embodiments, the offset drilling logs and the offset lithology logs may be correlated by depth. Specifically, the offset drilling logs and the offset lithology logs may be correlated to the interval (164) of the current well (300). In other words, the offset drilling logs and the offset lithology logs may be correlated to show the data recorded during the geologically similar interval of the offset wells (304).

In step 204, a first machine learning model is trained using the computer processor (705) and the offset drilling log to produce a first trained machine learning model. In accordance with one or more embodiments, the first trained machine learning model uses a recurrent neural network architecture. Specifically, the recurrent neural network includes a long short-term memory (LSTM) artificial convolutional neural network. In one or more embodiments, the neural structure (e.g., number of nodes and weights associated with the nodes) in the recurrent neural network is determined by a size of the interval (164).

Drilling log data is assumed to be sequential data. Therefore, the LSTM model may forecast the drilling log for a future section of the wellbore (102) to be drilled (i.e., the second portion (168) of the interval (164)). LSTM is used to perform sequential data forecast in most time series or time dependent sequential data. The data sequences in the present disclosure include the drilling logs. For each drilling log, the data is obtained at certain depths. For all the parameters along the drilling trajectory, strong correlations exist. Specifically, strong vertical patterns exist. The conventional standard neural network would treat all records along each depth as independent, which is erroneous and would bring misleading results for this sequentially collected data. In a sequential data modeling task, inputs appear as a sequence of elements as denoted in Equation (1) below:

$$X = \left(x^{(1)}, \ldots, x^{(T)}\right) \quad \text{Equation (1)}$$

Each element of the sequence, $x^{(t)} \in R^N$, is a vector of N features, as shown in Equation (2) below:

$$x^{(t)} = \left[x_1^{(t)}, x_2^{(t)}, \ldots, x_N^{(t)}\right] \quad \text{Equation (2)}$$

In LSTM, the input will be X, and the forecast sequence will be denoted as x_hat. Y is kept as the final lithology type. The target variable is also a sequence as denoted in Equation (3) below:

$$y = \left(y^{(1)}, y^{(2)}, \ldots, y^{(\tau)}\right) \quad \text{Equation (3)}$$

The resulting data has feature of sequential data. In such tasks, input elements form a sequence and outputs are also a sequence of drilling log curves.

LSTM is a type of recurrent neural network (RNN) which is a deep learning strategy for modeling sequential data. The order of elements in the sequence is useful and will be integrated in the neural networks for addressing the future steps forecast tasks. RNN is designed with the following criteria: ability to model variable length sequences without requiring additional parameters that depend on the sequence length and the capacity to respect element ordering.

The shortcoming of RNN is that it cannot remember long term dependencies due to vanishing gradient. Thus, LSTM networks are a special kind of RNN that are capable of learning long-term dependencies to allow information to persist. LSTM networks are capable of handling the vanishing gradient problem faced by RNN. LSTM networks have internal mechanisms called gates that can regulate the flow of information. These gates learn which data in a sequence is important to keep or throw away. By doing so, the LSTM networks can pass relevant information down the long chain of sequences to make predictions.

Figure 4:
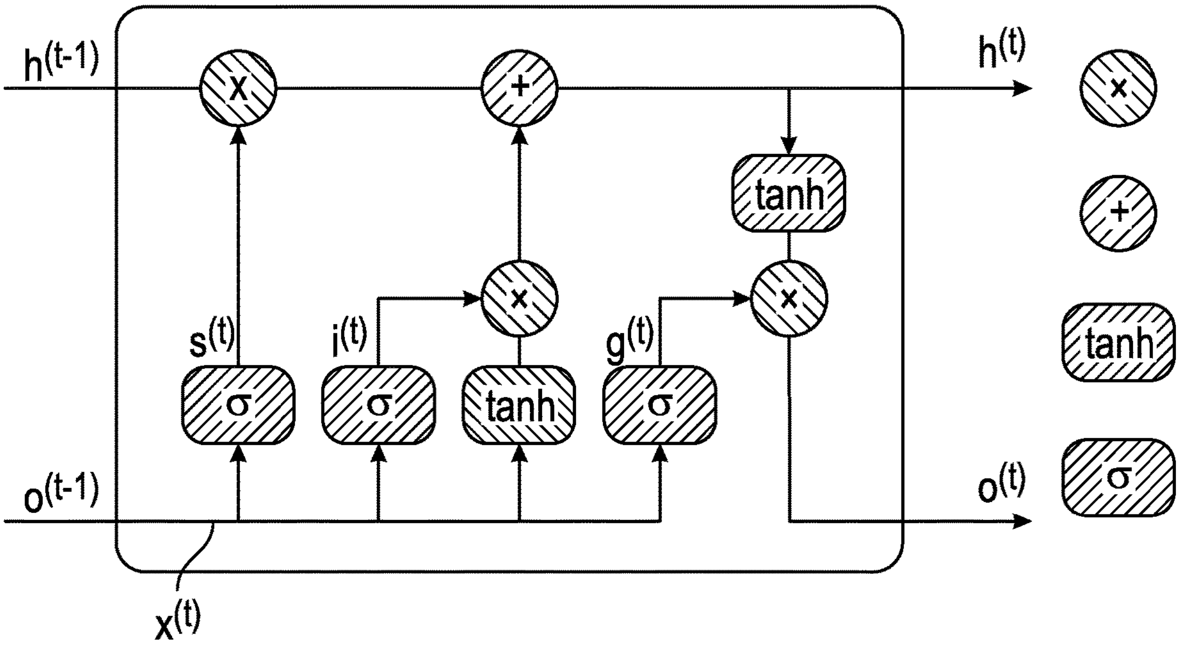
FIG. 4 shows an LSTM cell in accordance with one or more embodiments.

FIG. 4 shows an LSTM cell (400) in accordance with one or more embodiments. The LSTM cell (400) leverages a plurality of gating mechanisms. The LSTM cell (400) uses a specialized gate for each of its major components—the input, the state, and the output. As such, the gates in the LSTM cell (400) include the input gate $i^{(t)}$, a gate on the state (forget gate) $s^{(t)}$, and an output gate $g^{(t)}$ The gates are calculated using Equations (4), (5), and (6) below:

$$i^{(t)} = \sigma\left(W_s h^{(t-1)} + U_i x^{(t)} + b_i\right) \quad \text{Equation (4)}$$

$$s^{(t)} = \sigma\left(W_i h^{(t-1)} + U_s x^{(t)} + b_s\right) \quad \text{Equation (5)}$$

$$g^{(t)} = \sigma\left(W_g h^{(t-1)} + U_g x^{(t)} + b_g\right) \quad \text{Equation (6)}$$

In these equations, subscripts, i, s, and g on the weight matrices and biases indicate that these parameters are specific to the corresponding gate. The o denotes the sigmoid function. The states in the recurrent net are the encodings of the hidden units, typically denoted as vector: ($h^{(t)}$) with its associated time step. Just like the dynamical system, the state sequence is dependent on the previous states—the context. Additionally, the state sequence is also affected by the input at each time step. The parameters Wand U are weight matrices and bis the bias vector. Traditionally, the hyperbolic tangent activation function, tanh, was used to introduce nonlinearity, but other functions may be used.

With these gates, the calculations of the hidden state $h^{(t)}$ and the output vector of the cell $o^{(t)}$ are performed using Equation (7) and (8) below:

$$h^{(t)} = h^{(t-1)} \circ s^{(t)} + i^{(t)} \circ \sigma\left(\mathrm{W}h^{(t-1)} + Ux^{(t)} + b\right) \quad \text{Equation (7)}$$

$$o^{(t)} = \tanh\left(h^{(t)}\right) \circ g^{(t)} \quad \text{Equation (8)}$$

Where ○denotes the Hadamard (elementwise) product of its operands. The "forget gate" controls what information is maintained from the previous state. This takes in the previous cell output $h^{(t-1)}$ and the current input $x^{(t)}$ band applies a sigmoid activation layer o to get values between 0 and 1 for each hidden unit. This is followed by elementwise multiplication with the current state.

Next is an "update gate" that updates the state based on the current input. This passes the same input $x^{(t)}$, into a sigmoid activation layer σ, into a tanh activation layer, and performs elementwise multiplication between these two results. Next, elementwise addition is performed with the result and the current state after applying the "forget gate" to update the state with new information.

Finally, an "output gate" controls what information gets passed to the next state. The current state is run through a tanh activation layer and an element-wise multiplication is performed with the cell input and run through a sigmoid layer that acts as a filter on the output. This output is then passed to the LSTM cell (400) for the next input of the sequence and is also passed up to the next layer of the network.

Prior to training the first machine learning model, the offset drilling logs and the offset lithology logs may be prepared for the LSTM. This involves framing the dataset as a supervised learning problem and normalizing the input variables. The supervised learning problem is framed as predicting the drilling log curves at certain length of samples given the drilling log curves measurement at certain length of prior depth step.

FIG. 5 shows an example of LSTM training data (500) in accordance with one or more embodiments. The LSTM training data (500) has nine columns of data. Starting from the left, the first column corresponds to the name of the offset well (304), the second column corresponds to depths within the offset well (304), the third through the eighth column show the data for different drilling logs for each depth within the well. The drilling logs include flow pumps (FLWPMPS), bit size (BS), rotations per minute (RPM), weight on bit (WOB), rate of penetration (ROP), and torque (TORQ). The ninth column shows the lithology log.

In the LSTM network training, the inputs are multiple slices from the LSTM training data (500). Certain length of drilling log data will be used as training input ($x^1$, $x^2$, $x^T$). Immediately after those length of input, certain length of drilling log data will be picked as response ($y^1$, $y^2$, $y^T$). All sets of x and y will be the input features and the response of the model as shown in FIG. 5.

Continuing further with FIG. 2, in step 206, a forecasted drilling log for the second portion (168) of the wellbore (102) in the current well (300) is produced using the computer processor (705) and the first trained machine learning model. Further, data acquired from drilling the first portion (166) of the interval (164) of the current well (300) may be used in the first trained machine learning model to guide the first trained machine learning model to the proper drilling log forecasting of the second portion (168).

In step 208, a second machine learning model is trained using the computer processor, a gradient boosting machine learning technique, the forecasted drilling log, and the offset drilling log to produce a second trained machine learning model. In accordance with one or more embodiments, the gradient boosting technique is an extreme gradient boosting technique, also known as XGBoost. The second machine learning model may be any type of machine learning model that predicts a class label for a given example of input data such as support vector classification, k-Nearest Neighbors, Random Forest, etc.

FIG. 6 shows an example of boosting training data (600) in accordance with one or more embodiments. XGBoost is used for supervised learning problems, where the input training data (x) is used to predict a target variable (y). The prediction value will be different rock types classification (i.e., the lithology log). The parameter (coefficient θ) is the undetermined part that is needed to learn from the training data x and y.

For XGBoost, the core part is to construct the decision tree ensembles which consists of a set of classification and regression trees (CART). During model training the lithology is classified into different leaves, and each lithology is assigned the score on the corresponding leaf.

In CART, a real score is associated with each of the leaves, which gives interpretations that go beyond classification. This also allows for a principled, unified approach to optimization. Usually, a single tree is not strong enough to be used in practice. What is actually used is the ensemble model, which sums the prediction of multiple trees together. Mathematically, the ensemble model can be written as shown in Equation (9) below:

$$\hat{y}_i = \sum_{k=1}^{K} f_k(x_i),\ f_k \in F \qquad \text{Equation (9)}$$

Where K is the number of trees, $f$ is a function in the functional space F, where F is the set of all possible CARTS. The task of training the model is to find the best parameters θ that best fit the training data x and y. In order to train the model, the objective function may need to be defined to measure how well the model fits the boosting training data. In accordance with one or more embodiments, the open-source Python library XGboost is used.

In step 210, a forecasted lithology log for the second portion (168) of the current well (300) is produced using the computer processor (705) and the second trained machine learning model. That is, the second trained machine learning model is configured to predict a lithology log of the second portion (168) downhole of the drill bit (112) in the wellbore (102). In step 212, drilling parameters are adjusted in response to the forecasted lithology log. The remainder of the second portion (168) of the interval (164) of the wellbore (102) in the current well (300) may be drilled using the adjusted drilling parameters. The adjusted drilling parameters may be any drilling parameter such as bit size, weight on bit, density of the drilling mud, pressure of the mud pumps, rate of penetration, etc. Further, the adjusted drilling parameters may be used to drill (or continue drilling of) the wellbore of the current well or to drill a new well in the same geological region of interest.

In further embodiments, the first trained machine learning model and the second trained machine learning model may be updated using data gathered when drilling more of the wellbore (102) of the current well (300). Specifically, at least a section (170) of the second portion of the interval (164) of the current well (300) may be drilled and real drilling logs and real lithology logs of the section (170) may be obtained.

In an iterative process, the first trained machine learning model may be updated with the real drilling log for the section (170) to produce an updated first trained machine learning model. An updated forecasted drilling log for the second portion (168) of the interval (164) of the current well (300) is produced using the computer processor (705) and the updated first trained machine learning model.

Similarly, the second trained machine learning model may be updated with the updated forecasted drilling log and a real lithology log for at least a section (170) of the second portion (168) of the interval (164) of the current well (300) to produce an updated second trained machine learning model. An updated forecasted lithology log for the second portion (168) of the interval (164) of the current well (300) may be produced using the computer processor (705) and the second trained machine learning model.

In line with the above, the first trained machine learning model and the second trained machine learning model may be continuously updated with new data as the new data becomes available while drilling the current well (300). This requires the depth of the interval (164), the first portion (166), and the second portion (168) to change depending on where the drill bit (112) is and what portion of the wellbore (102) is requiring lithology forecasting.

Figure 7:
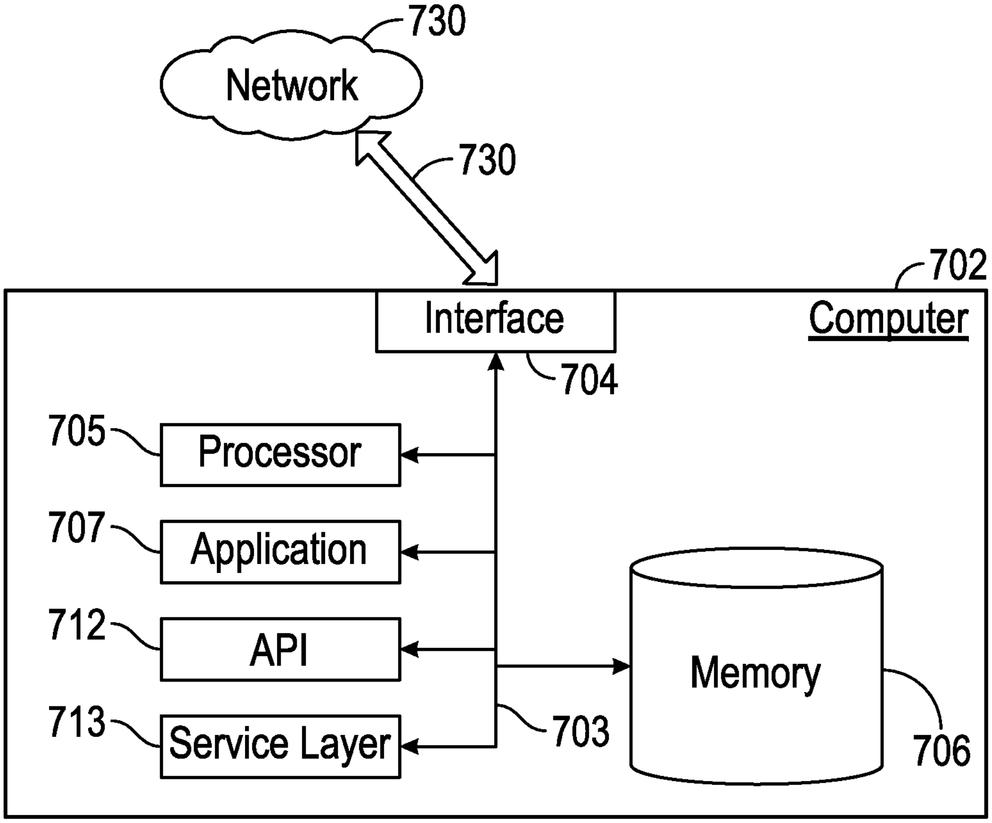
FIG. 7 shows a computer system in accordance with one or more embodiments.

FIG. 7 shows a computer (702) system in accordance with one or more embodiments. Specifically, FIG. 7 shows a block diagram of a computer (702) system used to provide computational functionalities associated with described algorithms, methods, functions, processes, flows, and procedures as described in the instant disclosure, according to an implementation.

The illustrated computer (702) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device.

Additionally, the computer (702) may include a computer that includes an input device, such as a keypad, keyboard, touch screen, or other device that can accept user information, and an output device that conveys information associated with the operation of the computer (702), including digital data, visual, or audio information (104, 106) (or a combination of information), or a GUI.

The computer (702) can serve in a role as a client, network component, a server, a database or other persistency, or any other component (or a combination of roles) of a computer system for performing the subject matter described in the instant disclosure. The illustrated computer (702) is communicably coupled with a network (730). In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) from a client application (for example, executing on another computer (702)) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713).

The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702).

The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or other suitable format.

While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730).

Generally, the interface (704) includes logic encoded in software or hardware (or a combination of software and hardware) and operable to communicate with the network (730). More specifically, the interface (704) may include software supporting one or more communication protocols associated with communications such that the network (730) or interface's hardware is operable to communicate physical signals within and outside of the illustrated computer (702).

The computer (702) includes at least one computer processor (705). Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a non-transitory computer (702) readable medium, or a memory (706), that holds data for the computer (702) or other components (or a combination of both) that can be connected to the network (730). For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing computer (702), each computer (702) communicating over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method comprising:

drilling, using a bottom hole assembly ("BHA"), a wellbore through a formation in a current well using a drill bit, wherein the formation comprises an interval having a first portion and a second portion, wherein the first portion of the formation includes a segment of the formation through which the wellbore has already been drilled and the second portion of the formation includes a segment of the formation through which the wellbore will be drilled;

recording, using one or more sensors mounted on the BHA, a measured drilling log in the wellbore penetrating the first portion of the formation;

obtaining a real-time lithology log of the first portion of the formation, wherein the real-time lithology log comprises a rock type of the first portion;

obtaining an offset drilling log and an offset lithology log for a geologically similar interval in an offset well, the geologically similar interval being geologically similar to the interval of the current well;

training a first machine learning model, using a computer processor and the offset drilling log, to produce a first trained machine learning model, wherein the first machine learning model is trained using a long short-term memory (LSTM) architecture to process the offset drilling log and produce a forecasted drilling log for the second portion of the formation, wherein training the first machine learning model includes:

assuming the offset drilling log as sequential to leverage an ability of the LSTM architecture to capture time-dependent patterns;

preparing the offset drilling log for supervised learning by normalizing input variables and framing a problem as predicting drilling log curves based on prior depth step measurements;

configuring LSTM cells with input, forget, and output gates to regulate information flow and maintain long-term dependencies in the offset drilling log;

generating training data slices from the offset drilling log, where input features correspond to specific depth intervals and response variables predict the forecasted drilling log for the second portion of the formation;

optimizing weights of the first machine learning model, biases, and activation functions to enhance accuracy in sequential data forecasting;

producing, using the computer processor and the first trained machine learning model, the forecasted drilling log for the second portion of the formation in the current well;

training a second machine learning model, using the computer processor, a gradient boosting machine learning technique, the forecasted drilling log, and the offset lithology log, to produce a second trained machine learning model;

producing, using the computer processor and the second trained machine learning model, a forecasted lithology log for the second portion of the formation of the current well from the measured drilling log in the wellbore penetrating the first portion of the formation, wherein the forecasted lithology log comprises a rock types classification for the second portion of the formation;

adjusting a density of drilling mud using the rock types classification;

drilling, using the BHA, the wellbore through the second portion of the formation using the adjusted drilling mud.

2. The method of claim 1, further comprising updating, using the computer processor, the first trained machine learning model with a real drilling log for at least a section of the second portion of the interval of the current well to produce an updated first trained machine learning model.

3. The method of claim 2, further comprising producing, using the computer processor and the updated first trained machine learning model, an updated forecasted drilling log for the second portion of the interval of the current well.

4. The method of claim 3, further comprising updating, using the computer processor, the second trained machine learning model with the updated forecasted drilling log and a real lithology log for at least the section of the second portion of the interval of the current well to produce an updated second trained machine learning model.

5. The method of claim 4, further comprising producing, using the computer processor and the second trained machine learning model, an updated forecasted lithology log for the second portion of the interval of the current well.

6. The method of claim 1, further comprising correlating, using the computer processor, the offset drilling log and the offset lithology log from the offset well by depth.

7. The method of claim 1, wherein a size of the interval determines a parameter in the LSTM architecture.

8. The method of claim 1, wherein the offset drilling log and the forecasted drilling log comprise one or more curves selected from a list consisting of: weight on bit, rotations per minute, bit size, torque, flow pump rate, rate of penetration, mechanical specific energy, and mud-log lithology.

9. A system comprising:

a current well having a wellbore being drilled, by a bottom hole assembly ("BHA") comprising a drill bit, through a formation, wherein the formation comprises an interval having a first portion and a second portion, wherein the first portion of the formation includes a segment of the formation through which the wellbore has already been drilled and the second portion of the formation includes a segment of the formation through which the wellbore will be drilled, wherein the BHA further comprises at least one sensor configured to record a measured drilling log in the wellbore penetrating the first portion of the formation, wherein a real-time lithology log of the first portion of the formation is obtained, and wherein the real-time lithology log comprises a rock type of the first portion; and a non-transitory computer readable medium in electronic communication with the current well and storing a set of instructions, executable by a computer processor, the set of instructions comprising functionality for:

obtaining an offset drilling log and an offset lithology log for a geologically similar interval in an offset well, the geologically similar interval being geologically similar to the interval of the current well, training a first machine learning model, using the offset drilling log, to produce a first trained machine learning model, wherein the first machine learning model is trained using a long short-term memory (LSTM) architecture to process the offset drilling log and produce a forecasted drilling log for the second portion of the formation, wherein training the first machine learning model includes:

assuming the offset drilling log as sequential to leverage an ability of the LSTM architecture to capture time-dependent patterns;

preparing the offset drilling log for supervised learning by normalizing input variables and framing a problem as predicting drilling log curves based on prior depth step measurements;

configuring LSTM cells with input, forget, and output gates to regulate information flow and maintain long-term dependencies in the offset drilling log;

generating training data slices from the offset drilling log, where input features correspond to specific depth intervals and response variables predict the forecasted drilling log for the second portion of the formation; and optimizing weights of the first machine learning model, biases, and activation functions to enhance accuracy in sequential data forecasting, producing, using the first trained machine learning model, the forecasted drilling log for the second portion of the wellbore in the current well, training a second machine learning model, using a gradient boosting machine learning technique, the forecasted drilling log, and the offset lithology log, to produce a second trained machine learning model, producing, using the second trained machine learning model, a forecasted lithology log for the second portion of the current well, from the measured drilling log, wherein the forecasted lithology log comprises a rock types classification for the second portion of the formation;

adjusting a density of drilling mud using the rock types classification;

drilling, using the BHA and drill bit, the wellbore through the second portion of the formation using the adjusted drilling mud.

10. The system of claim 9, wherein the set of instructions further comprising functionality for updating the first trained machine learning model with a real drilling log for at least a section of the second portion of the interval of the current well to produce an updated first trained machine learning model.

11. The system of claim 10, wherein the set of instructions further comprising functionality for producing, using the updated first trained machine learning model, an updated forecasted drilling log for the second portion of the interval of the current well.

12. The system of claim 11, wherein the set of instructions further comprising functionality for updating the second trained machine learning model with the updated forecasted drilling log and a real lithology log for at least the section of the second portion of the interval of the current well to produce an updated second trained machine learning model.

13. The system of claim 12, wherein the set of instructions further comprising functionality for producing, using the second trained machine learning model, an updated forecasted lithology log for the second portion of the interval of the current well.

14. The system of claim 9, wherein the set of instructions further comprising functionality for correlating the offset drilling log and the offset lithology log from the offset well by depth.

15. The system of claim 9, wherein a size of the interval determines parameter in the LSTM architecture.

16. The system of claim 9, wherein the offset drilling log and the forecasted drilling log are one or more curves selected from a list consisting of: weight on bit, rotations per minute, bit size, torque, flow pump rate, rate of penetration, mechanical specific energy, and mud-log lithology.

* * * * *